US008487482B2

(12) United States Patent
Moosbauer

(10) Patent No.: US 8,487,482 B2
(45) Date of Patent: Jul. 16, 2013

(54) CIRCUIT FOR CONTROLLING POWER SUPPLY TO A CONSUMER AND METHOD FOR OPERATING A CIRCUIT

(75) Inventor: Peter Moosbauer, Penzberg (DE)

(73) Assignee: Messtec Power Converter GmbH, Penzberg (DE)

(*) Notice: Subject to any disclaimer, the term of this patent is extended or adjusted under 35 U.S.C. 154(b) by 465 days.

(21) Appl. No.: 12/744,620

(22) PCT Filed: Nov. 7, 2008

(86) PCT No.: PCT/EP2008/009407
§ 371 (c)(1),
(2), (4) Date: Jul. 29, 2010

(87) PCT Pub. No.: WO2009/068163
PCT Pub. Date: Jun. 4, 2009

(65) Prior Publication Data
US 2010/0283321 A1    Nov. 11, 2010

(30) Foreign Application Priority Data

Nov. 27, 2007   (DE) .................. 10 2007 056 955

(51) Int. Cl.
*H01H 19/64*   (2006.01)
*H01H 31/10*   (2006.01)
*H01H 33/52*   (2006.01)
*H01H 33/59*   (2006.01)
*H01H 47/00*   (2006.01)
*H01H 85/46*   (2006.01)

(52) U.S. Cl.
USPC ......................................................... 307/114

(58) Field of Classification Search
USPC .......... 307/114, 115, 116, 140, 106; 323/271, 323/283
See application file for complete search history.

(56) References Cited

U.S. PATENT DOCUMENTS

| 4,750,100 A | 6/1988 | Ragsdale |
| 4,992,921 A | 2/1991 | Albach et al. |

(Continued)

FOREIGN PATENT DOCUMENTS

| DE | 2219043 | 10/1973 |
| DE | 3718941 | 2/1988 |

(Continued)

OTHER PUBLICATIONS

Translation of the PCT International Preliminary Report on Patentability for PCT Application No. PCT/EP2008/009407.

(Continued)

*Primary Examiner* — Carlos Amaya
(74) *Attorney, Agent, or Firm* — Gardner, Linn, Burkhart & Flory, LLP

(57) ABSTRACT

A circuit for operating a consumer comprises a current source, a first switch connected in parallel with the consumer and actuated potentially separate, whereby opening and closing the first switch transmits power to the consumer in the form of square wave current pulses. The negative branch includes a potentially separately actuated second switch connected in parallel with the first switch and in series with the consumer, as well as a first load connected in parallel with the first switch and in series with the consumer. The positive branch includes a potentially separately actuated third switch connected in parallel with the first switch and in series with the consumer and second switch, as well as a second load connected in parallel with the first switch and in series with the consumer and the second switch. The second and third switches are opened and closed in anti-phase manner to the fist switch.

17 Claims, 13 Drawing Sheets

U.S. PATENT DOCUMENTS

| | | | |
|---|---|---|---|
| 5,764,037 A | 6/1998 | Jacobs et al. | |
| 5,804,925 A | 9/1998 | Salbert et al. | |
| 2002/0093836 A1 | 7/2002 | Goepfrich et al. | |
| 2004/0217747 A1 | 11/2004 | Ying et al. | |
| 2007/0230228 A1 | 10/2007 | Mao | |
| 2007/0296278 A1 | 12/2007 | Sekiya et al. | |
| 2010/0109617 A1 | 5/2010 | Eardl | |
| 2011/0044079 A1 | 2/2011 | Moosbauer | |
| 2011/0057519 A1* | 3/2011 | Wakatsuki et al. | 307/115 |

FOREIGN PATENT DOCUMENTS

| | | |
|---|---|---|
| DE | 3840304 | 5/1990 |
| DE | 4440013 | 3/1996 |
| DE | 19517875 | 11/1996 |
| DE | 102005002359 | 7/2006 |
| EP | 0060020 | 9/1982 |
| EP | 1211797 | 6/2002 |
| EP | 1714725 | 10/2006 |
| WO | 2006/057365 | 1/2006 |

OTHER PUBLICATIONS

Shoyama et al. "Common-Mode Noise Reduction by Current Cancellation in Balanced Buck-Boost Switching Converter", Intelec 2003, 25th, International Telecommunications Energy Conference, Yokohama, Japan, Oct. 19-23, 2003.

* cited by examiner

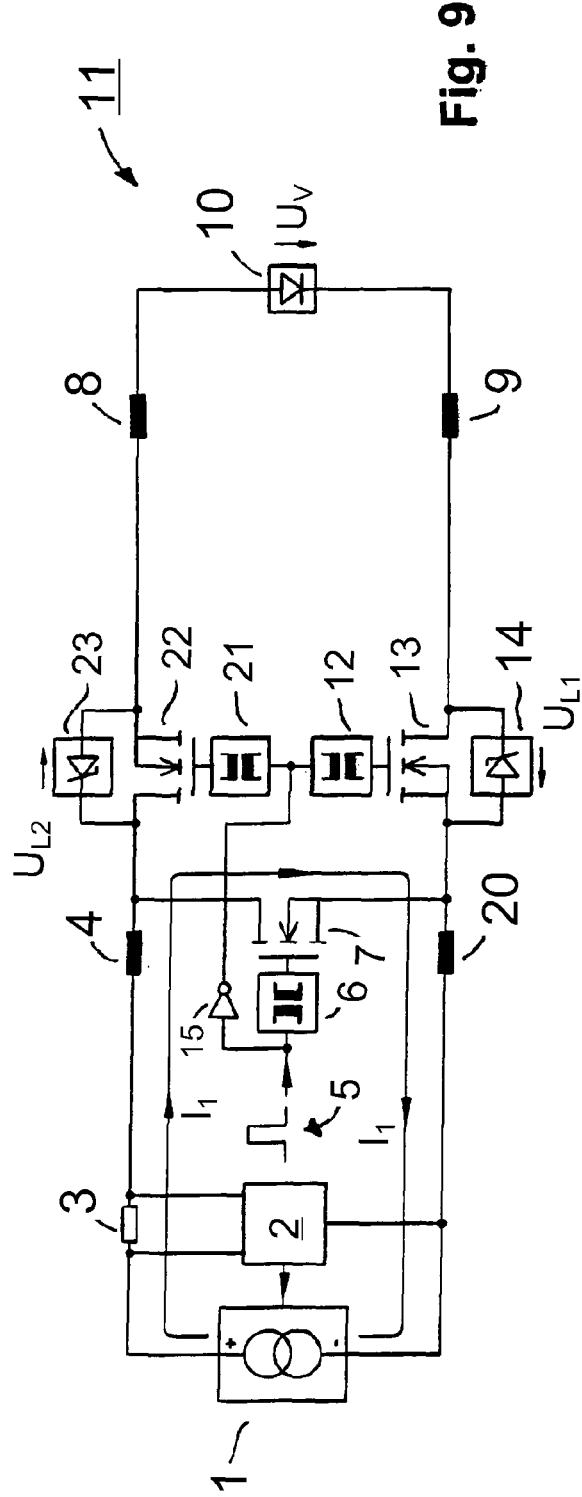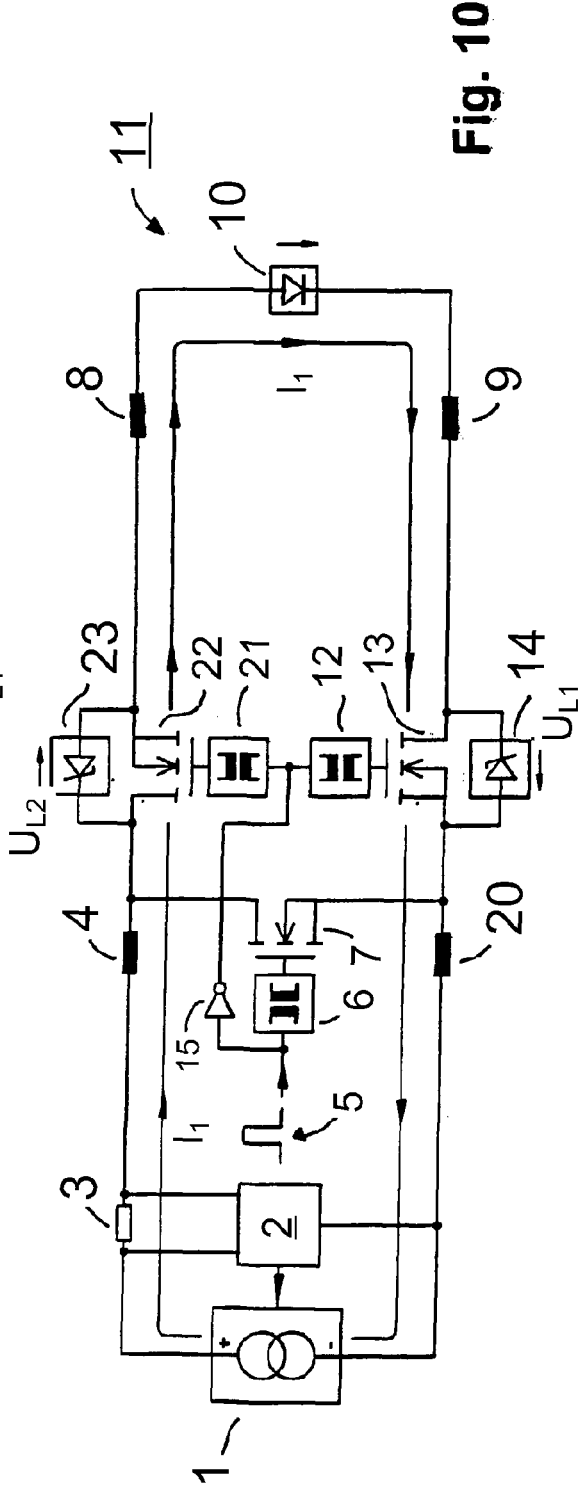

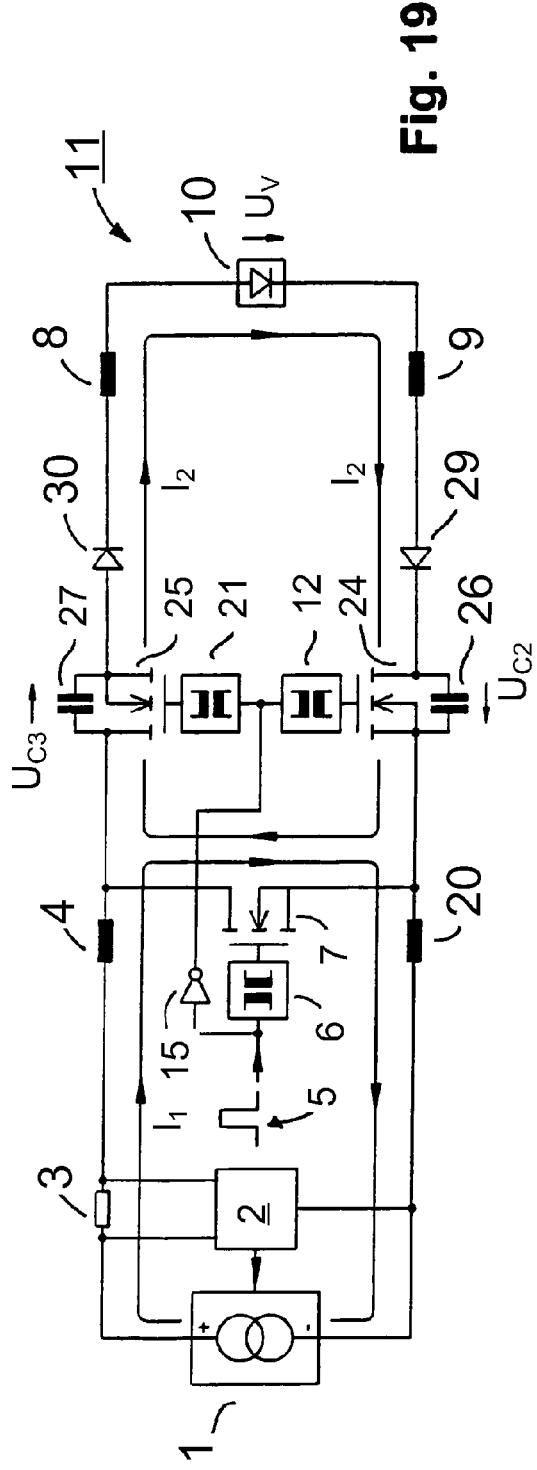
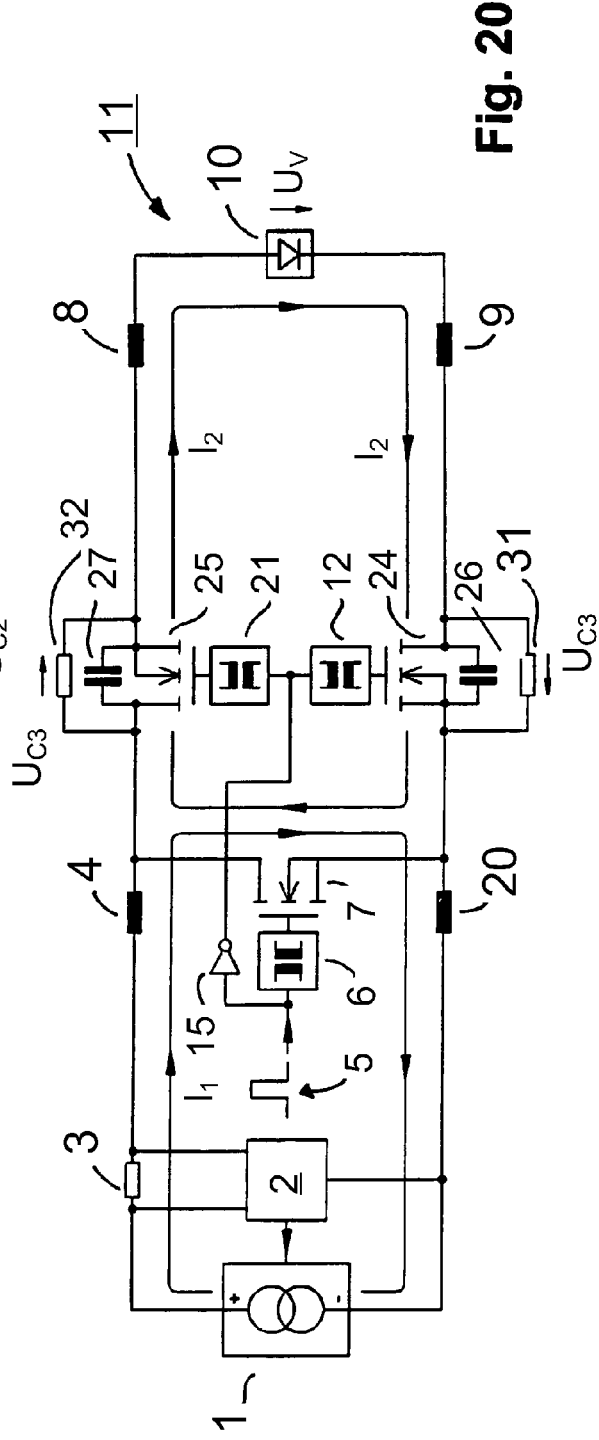

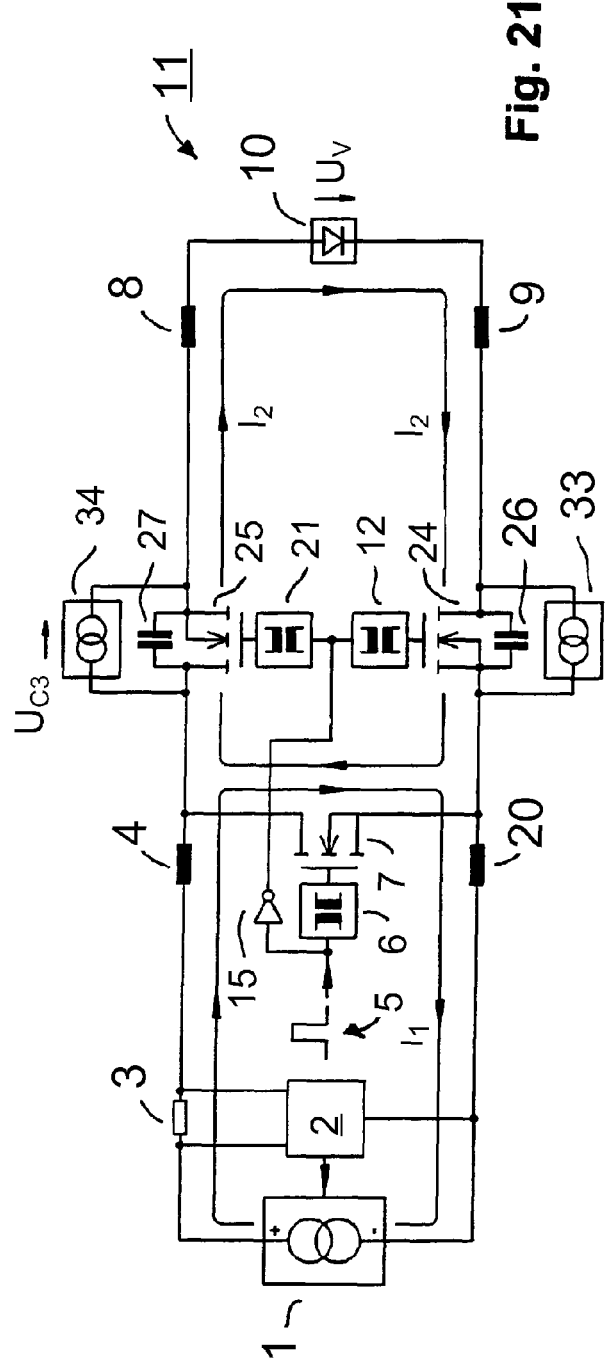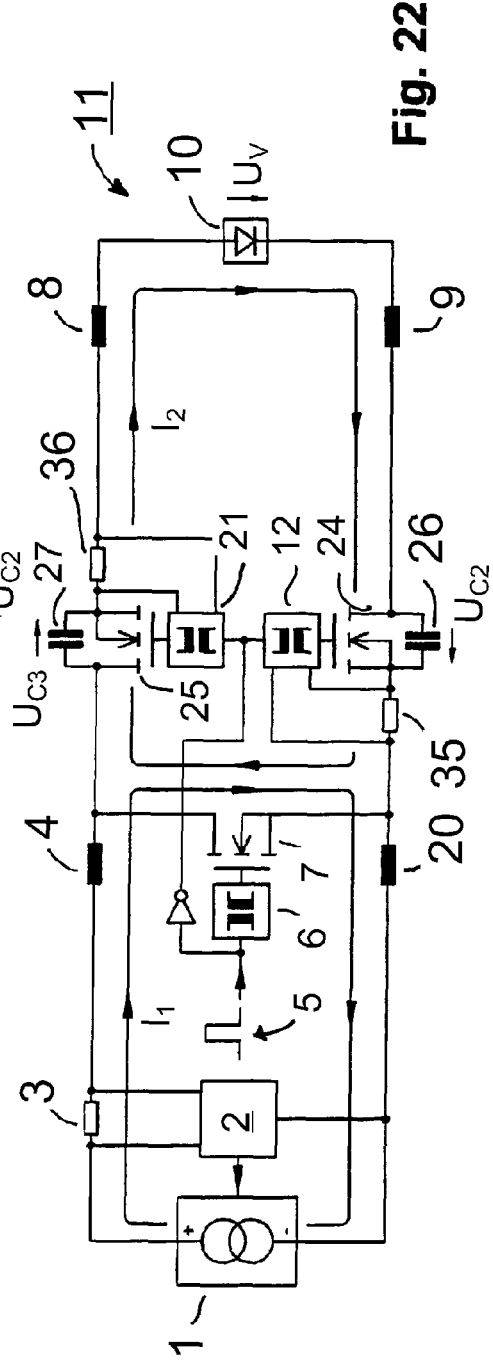

CIRCUIT FOR CONTROLLING POWER SUPPLY TO A CONSUMER AND METHOD FOR OPERATING A CIRCUIT

BACKGROUND OF THE INVENTION

The present invention concerns a circuit for controlling the power supply of a consumer, as well as a method of operating a circuit. The present invention especially concerns a low-interference power supply of a consumer with current pulses.

FIGS. 1-3 show a circuit as it is currently known. A known circuit 100 comprises a switch mode current source 1 SMC. The current source 1 is controlled by means of a control system 2, so that it is possible to maintain the power $I_1$ supplied by the current source 1. Here the control system comprises a current measuring device via a resistor 3 in order to guarantee a respective control of the current source.

Furthermore, the circuit 100 comprises inductance 4, as well as a consumer 10 that is supplied with power by means of the current source. In an exemplary manner the consumer 10 is depicted as a diode operating in forward direction.

Parallel to the consumer 10, the circuit 11 comprises a first switch 7 which is controlled via a first driver unit 6. For this purpose, the first driver unit 6 is supplied with a pulse control signal 5 consisting of pulses and pulse intervals so that during the pulse interval the switch 7 is conductively controlled via a driver unit 6, and during a pulse the switch is suddenly block controlled.

The functionality of the known circuit is divided in three phases P1, P2 and P3, depending on the pulse control signal 5. FIGS. 1-3 provide a schematic picture of the three phases, whereas FIG. 1 shows the first phase, FIG. 2 the second phase, and FIG. 3 the third phase.

The pulse control signal consists of pulses and intermediate pulse intervals. In the present description the first pulse interval is denoted with P1, a subsequent pulse with P2, and a second pulse interval following pulse P2 is denoted with P3.

In the currently known circuit a second switch 13 has been provided which is connected in series to the consumer 10 and parallel to the first switch 7. This second switch 13 is actuated anti-phase to the first switch, which means that during the process of closing the first switch the second switch is opened and vice versa. In the context of the present invention, the term "closing" a switch means that the switch is conductively controlled by the respective driver unit. Similarly, the term "opening" a switch means that the switch is block controlled by the respective driver. Furthermore, a load 14 has been provided which is arranged in series to the consumer 10 and parallel to the first switch 6 and which comprises high load voltage. In this way it is possible to reduce considerably the fall time.

Subsequently, by means of FIGS. 1, 2 and 3, the functionality of the known circuit 100 is explained. FIG. 1 depicts the first phase P1 of the pulse control signal 5, FIG. 2 the second phase P2 of the pulse control signal 5, and FIG. 3 the third phase P3 of the pulse control signal 5.

FIG. 1 shows a pulse inverter 15 which inverts the pulse control signal 5 and transmits it to a second driver unit 12. In its functionality, the second driver unit 12 corresponds to the first driver unit 6 and is used to actuate the second switch 13. The load 14 is connected in parallel to the second switch 13.

FIG. 1 provides a schematic picture of the first phase P1 of the pulse control signal 5. During the pulse interval, the first switch 7 is conductively controlled and the second switch 13 is block controlled. The adjusted power $I_1$, which has been impressed by the current source 1, flows through the inductance 4 and the first switch 7 back to the current source 1. The consumer 10, the load 14 and the second switch 13 are currentless.

FIG. 2 provides a schematic picture of the second phase P2, namely the pulse signal. By means of the pulse signal the first switch 7 is suddenly block controlled and, at the same time, the second switch 13 is conductively controlled so that the power $I_1$ impressed via the current source 1 no longer flows through the first switch 7 but, because of the behavior of the current source 1 and inductance 4, said power flows back with a short rise time to the current source 1 in the form of pulses and square waves through the consumer 10 and the second switch 13.

FIG. 3 provides a schematic picture of the third phase P3, namely the pulse signal. Also in this pulse interval the first switch 7 is conductively controlled and, at the same time, the second switch 13 is block controlled. In this way the consumer 10 becomes currentless the same as the second switch 13 and the impressed power $I_1$ and flows again back to the current source 1 via the inductance 4 and the first switch 7.

At the start of the third phase P3 power $I_2$ flows through the consumer 10 because of the magnetic energy stored in the circuit inductances 8, 9 during the second phase P2. At the start of the third phase P3 the power $I_2$ has the same value as power $I_1$.

However, as time increases, the power is reduced until it reaches zero.

For this purpose, parallel to the second switch 13, a load 14 has been provided which can be a Zener diode with high Zener voltage. At the load 14 the decaying power $I_2$ generates a load voltage $U_L$ which together with the secondary voltage $U_V$ of the consumer 10 forms an overall voltage with regard to the fall time t of the power $I_2$. The load 14 is designed in such a way that it produces high load voltage $U_L$, resulting in a very short fall time of the power $I_2$.

If the secondary voltage $U_V$ and the load voltage $U_L$ are not power-dependent, the following applies to the fall time t of the power $I_2$:

$$t = \frac{I_1(L_1 + L_2)}{U_V + U_L}$$

For example, in case of a circuit inductance of respectively 50 nH, a load current of 100 A, a secondary voltage $U_V$ of 2V, and a load voltage $U_L$ of 100 V, the fall time results in:

$$t = \frac{100A \cdot (50 + 50) \cdot 10^{-9}H}{2V + 100V} = 98 \cdot 10^{-9} s$$

Because of the anti-phase actuation of both switches the power $I_2$ can be directed to zero via a load with high load voltage within a short period of time.

In a known circuit the switch mode current source in particular can cause high frequency interferences in the control unit. As shown in FIG. 4, the control system 2 can be coupled with the ground 19, i.e., with the housing and/or the earth, in order to reduce these high frequency interferences. The coupling with the ground can take place in galvanic or capacitive manner or at high frequency by means of a capacitor 18 so that the ground (Gnd) of the control system 2 is connected with a metallic housing which, in turn, is electrically connected with earth 19.

FIG. 4 shows that, besides the circuit inductances 8, 9, the known circuit comprises a first line capacity 16 and a second line capacity 17 to the earth, which line capacities are shown in the equivalent circuit diagram in FIG. 4 as capacitors 16, 17.

By means of the circuit shown in FIG. 4, it is possible to minimize the high frequency interferences. However, the circuit shows several disadvantages. The known circuit has especially the disadvantage that in the various phases of the pulse control signal 5 power flows through the ground 19, i.e., through the housing or the earth. Subsequently, by means of FIGS. 4-8, this is explained in more detail.

FIG. 4 shows the first phase P1, which is the pulse interval. During the first phase P1, the first switch 7 is conductively controlled, whereas the second switch 13 is block controlled. The adjusted power $I_1$, which has been impressed by the current source 1, flows through the inductance 4 and the first switch 7 in the line between D and C back to the current source 1.

FIG. 5 shows the time period between the end of phase P1 and the start of the second phase P2 of the pulse control signal 5. At this the first switch 7 is suddenly block controlled and, at the same time, the second switch 13 is conductively controlled. The voltage at the first switch 7 jumps to very high values, for example, several 100 V, because the current source 1 and especially the inductance 4 make an attempt to maintain the current flow $I_1$. However, at first, both circuit inductances 8, 9 prevent a current flow through the consumer 10. Therefore, the current now flows suddenly via the first line capacity 16, through the metallic housing 19 or through the earth 19 and via the capacitor 18 back to the current source 1.

In this phase considerable high frequency interferences occur and, at the same time, a high frequency interference voltage occurs in the line between D and C, because this line is suddenly supplied with power.

A further disadvantage is the fact that, at the moment of the voltage jump at the first switch 7, the potential at point A in reference to earth jumps to a positive value corresponding to the voltage at the first switch 7. On the other hand, because of the galvanic or high frequency grounding of the control system 2, the potential at point B remains completely or nearly at earth potential. In case the circuit inductances 8, 9 values are equal, the potential at the consumer 10 in reference to earth jumps to half the value of the potential at point A.

If the consumer 10 is not adequately insulated to ground 19, it can result in a breakdown or destruction of the consumer 10.

FIG. 6 shows the second phase P2. In this phase further high frequency interferences can occur if, as shown in FIG. 6, the consumer 10 has assumed the power $I_1$, because now there suddenly no power flows any longer via the first line capacity 16, through the metallic housing or through the earth 19 and via the capacitor 18 and, at the same time, the line between D and C is suddenly supplied again with the power $I_1$.

FIG. 7 shows the time period between the end of the second phase P2 and the start of the third phase P3 of the pulse control signal 5. Here, the first switch 7 is suddenly conductively controlled and, at the same time, the second switch 13 is block controlled. The power $I_1$ now flows again via the first switch 7 back to the current source 1. At the same time, because of the energy stored in the circuit inductances 8, 9, an impressed power $I_2$ continues to flow through the consumer 10. Since the second switch 13 is blocking, power $I_2$ flows (as shown in FIG. 7) suddenly back in the line between C and D, via the second line capacity 17, through the metallic housing or through the earth 19 and via the capacitor 18.

At this considerably high frequency interferences occur and, at the same time, a high frequency interference voltage occurs in the line between C and D because the line supplied with the power $I_1$ is severely interrupted by the power $I_2$.

Furthermore, the second line capacity 17 is quickly charged with the power $I_2$. If the voltage at the second line capacity 17 has reached the breakdown voltage $U_{LL}$ of the load 14 which is, for example, depicted as a Zener diode, the load 14 suddenly assumes the power $I_2$, as shown in FIG. 8.

This again results in high frequency interferences because the metallic housing or the earth 19 is suddenly without power $I_2$. At the same time a considerably high frequency interference voltage occurs in the line between C and D because the line is now also suddenly without power $I_2$.

A further disadvantage is the fact that the potential at point B in reference to earth 19 jumps to a positive value corresponding to the load voltage $U_{LL}$. On the other hand, because of the conductively controlled first switch 7 and the galvanic or high frequency grounding of the control system 2 via the capacitor 18, the potential at point A remains completely or nearly at earth potential. In case the circuit inductances 8, 9 values are equal, the potential at the consumer 10 in reference to earth jumps to half the value of the potential at point B. If the consumer 10 is not adequately insulated to ground 19, it can result in a breakdown or destruction of the consumer 10.

SUMMARY OF THE INVENTION

It is therefore the objective of the present invention to resolve the disadvantages of the known circuit. In particular the invention has the objective of providing a circuit for controlling the power supply of a consumer, as well as a method for operating a circuit which allows for short rise times, as well as short fall times and which, at the same time, reduces interferences. Furthermore, it is the objective of the present invention to provide a secure circuit in which a possible housing that houses the circuit is not supplied with power. In addition it is the objective of the present invention to reduce the danger of destroying the components of the circuit.

This objective is achieved by means of the characteristics of the independent claims. Advantageous embodiments are discussed in the sub-claims.

The present invention concerns a circuit for controlling the power supply of a consumer comprising a current source for providing power supply to a consumer, a first switch which is connected in parallel with the consumer and actuated potentially separate. By opening and closing the first switch the power is transmitted to the consumer in the form of square wave current pulses, in the negative branch a second switch actuated potentially separate, connected in parallel with the first switch and connected in series with the consumer, as well as a first load connected in parallel with the first switch and connected in series with the consumer, and in the positive branch a third switch actuated potentially separate, connected in parallel with the first switch and in series with the consumer and to the second switch, as well as a second load connected in parallel with the first switch and connected in series with the consumer and with the second switch, whereas the second switch and the third switch are opened and closed in antiphase manner to the first switch.

Preferably, the current source is a DC current source.

In a first embodiment, the first load is connected in parallel with the second switch and the second load is connected in parallel with the third switch.

In this first embodiment, the first load and/or the second load can comprise a resistor, a voltage-dependent resistor, a capacitor, a diode, a Zener diode, a suppressor diode, a semiconductor with controlled avalanche behavior or a combination herefrom.

In a second to seventh embodiment, the second switch and the first load are combined in a component and the third switch and the second load are combined in a component.

Preferably, the load and the associated switch are combined in a semi-conductor switch with controlled avalanche behavior.

Advantageously, the controlled avalanche behavior of the semi-conductor switch can be produced by means of the characteristics of the semi-conductor.

Alternatively, the controlled avalanche behavior of the semi-conductor can be produced by means of external wiring of the semi-conductor.

In a third embodiment a first protective diode is connected in parallel with the consumer.

In a fourth embodiment a second protective diode in the negative branch is connected in series with the consumer and a third protective diode is connected in series with the consumer in the positive branch.

In a fifth embodiment a first resistor is connected in parallel with the second switch and a second resistor is connected in parallel with the third switch.

In a sixth embodiment a first constant current load is connected in parallel with the second switch and a second constant current load is connected in parallel with the third switch.

In a seventh embodiment a system for current measurement has been provided and by means of a suitable arrangement a signal is supplied to the second switch and the third switch in such a way that the second switch and the third switch are again conductively controlled below a specific power.

Further characteristics, advantages and features of the present invention are explained by means of the figures of the accompanying drawings and the detailed description of the embodiments.

DESCRIPTION OF THE PREFERRED EMBODIMENTS

Figure 1:
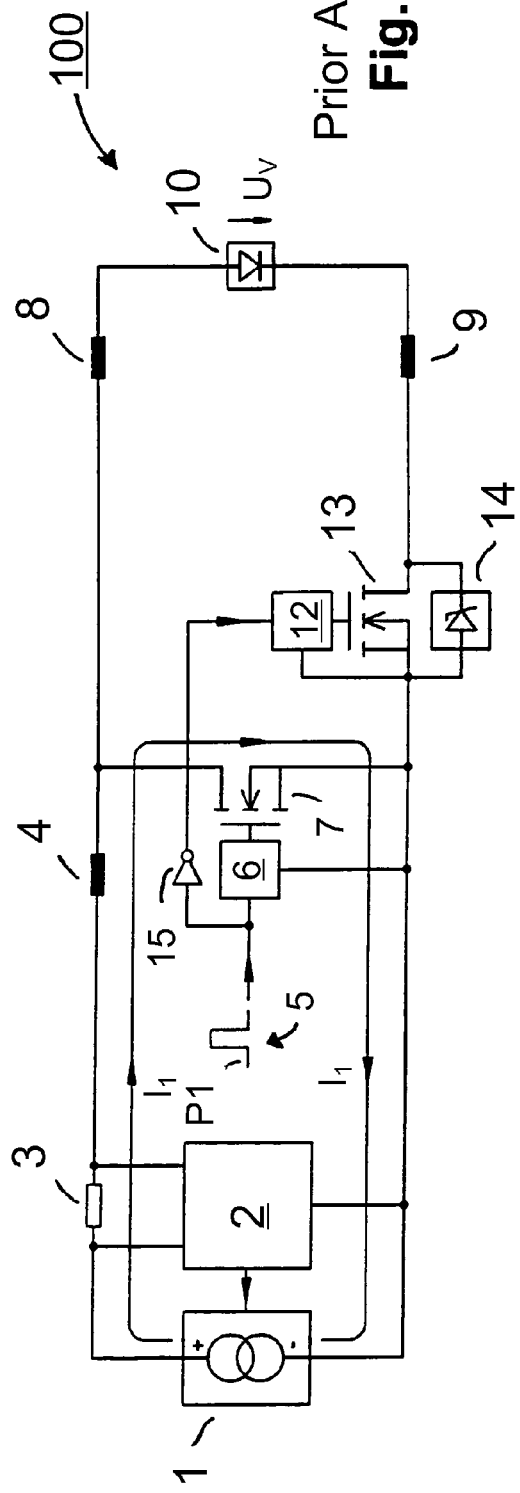
FIG. 1 a first phase of a first known circuit,
FIG. 2 a second phase of a first known circuit,
FIG. 3 a third phase of a first known circuit,
FIG. 4 a first phase of a second known circuit,
FIG. 5 the transition from the first to a second phase of a second known circuit,
FIG. 6 a second phase of a second known circuit,
FIG. 7 the transition from the second to a third phase of the second known circuit,
FIG. 8 a third phase of a second known circuit,
FIG. 9 a first phase of a first embodiment of the present invention,
FIG. 10 a second phase of a first embodiment of the present invention,
FIG. 11 a third phase of a first embodiment of the present invention,
FIG. 12 a first phase of a first embodiment of the present invention,
FIG. 13 the transition from the first phase to a second phase of a first embodiment of the present invention,
FIG. 14 a second phase of a first embodiment of the present invention,
FIG. 15 the transition from the second to a third phase of a first embodiment of the present invention,
FIG. 16 a third phase of a first embodiment of the present invention,
FIG. 17 the third phase of a second embodiment of the present invention,
FIG. 18 the third phase of a third embodiment of the present invention,
FIG. 19 the third phase of a fourth embodiment of the present invention,
FIG. 20 the third phase of a fifth embodiment of the present invention,
FIG. 21 the third phase of a sixth embodiment of the present invention,
FIG. 22 the third phase of a seventh embodiment of the present invention.
Figure 2:
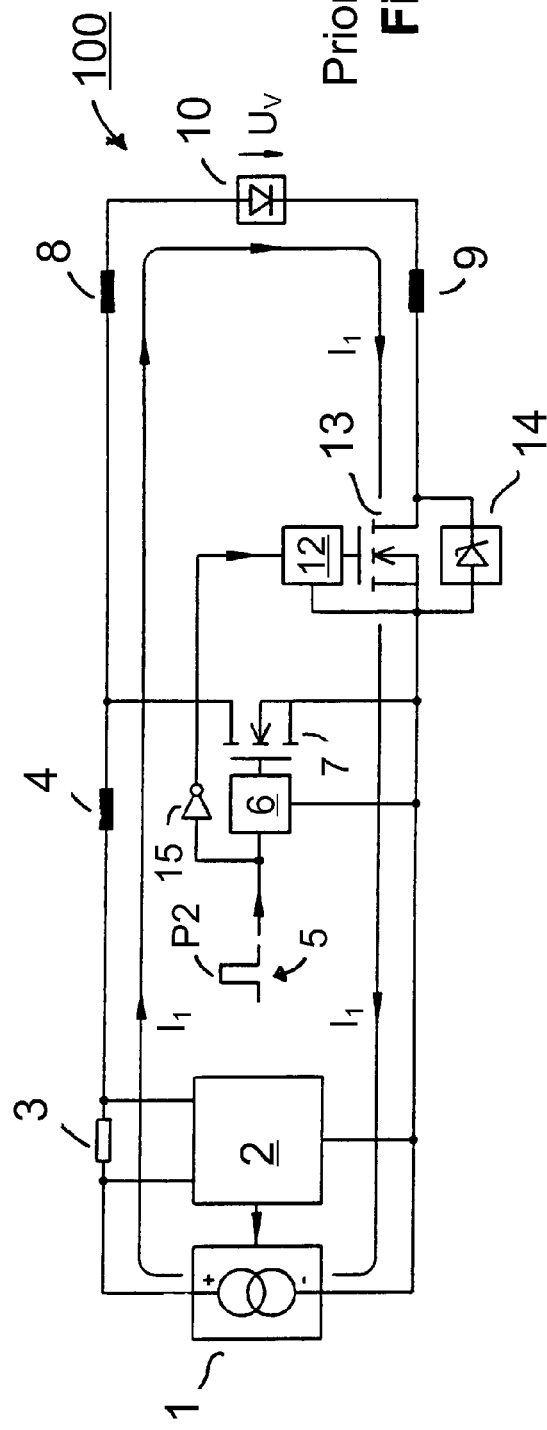
Figure 3:
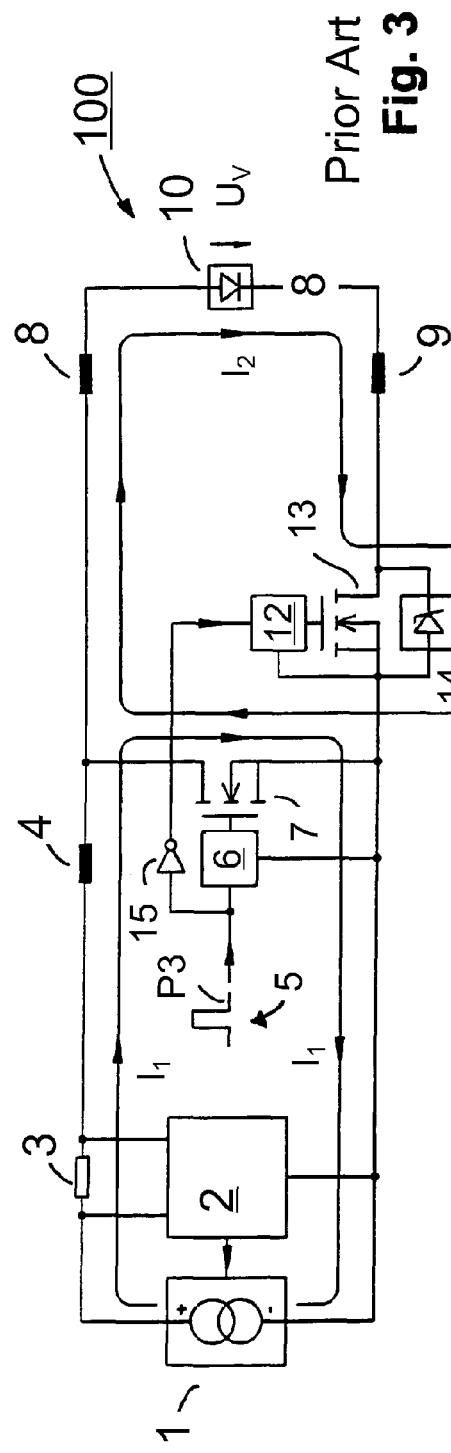
Figure 4:
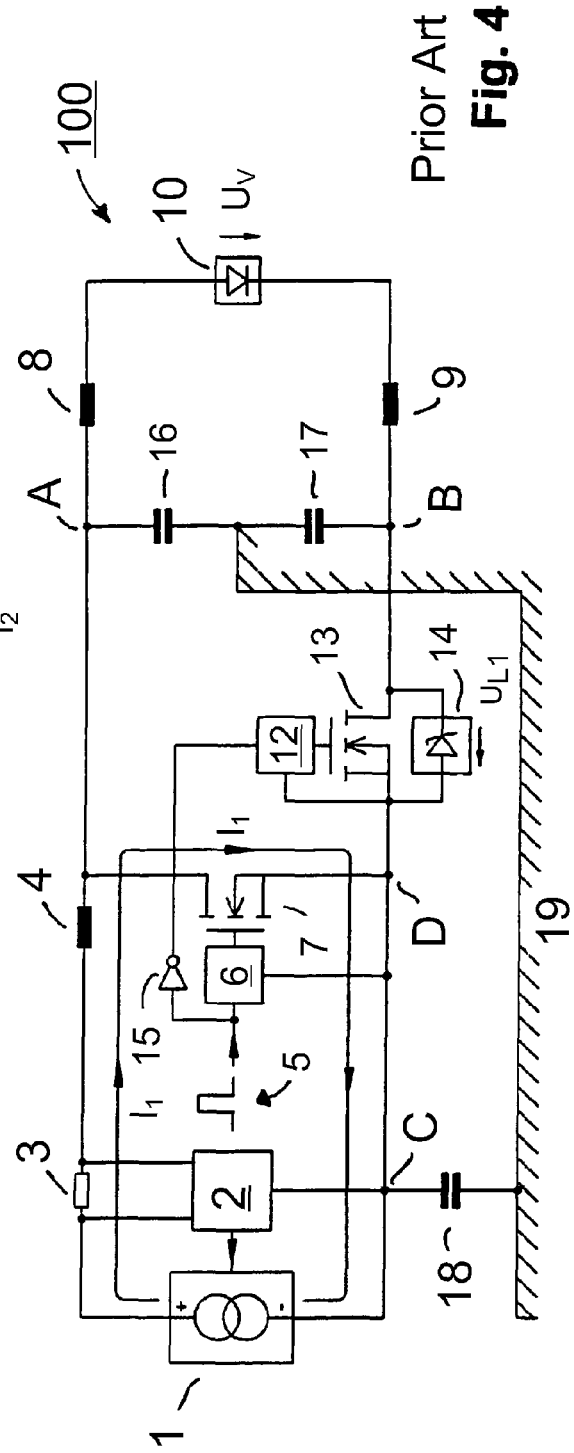

FIGS. 9-22 show the different embodiments of the present invention. The same components are depicted with the same reference numerals. A circuit 11 according to the present invention comprises a current source 1 which is preferably a switch mode current source 1 SMC. The current source 1 is controlled by means of a control system 2 so that the power $I_1$ provided by the current source 1 can be maintained. The control system comprises a current measuring device by means of a resistor 3 in order to guarantee that the current source is appropriately actuated.

Furthermore, the circuit 11 comprises a first inductance 4 in the positive branch, a second inductance 20 in the negative branch, as well as a consumer 10 which is supplied with power by means of the current source 1. In the embodiment shown, the consumer 10 is depicted in an exemplary manner as a diode operating in forward direction. However, the consumer 10 is not restricted to the embodiment shown and can be applied to any other consumer 10 which is operated with current pulses.

Figure 11:
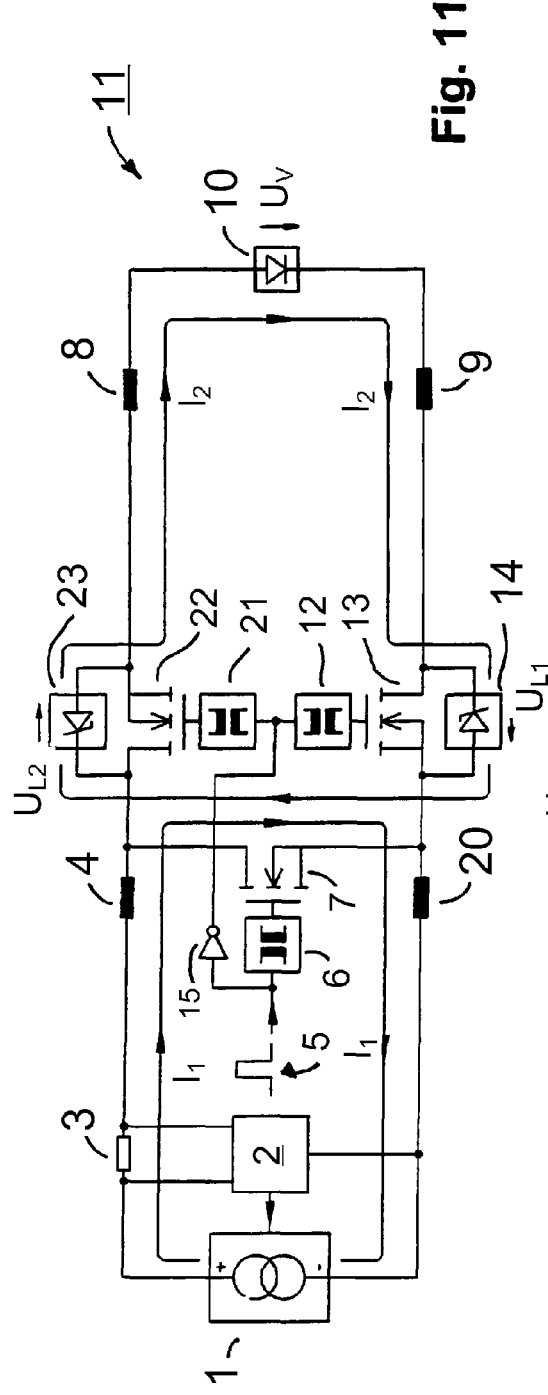

Parallel to the consumer 10, the circuit 11 comprises a switch 7 which is actuated potentially separate by a first driver unit 6 depicted in FIGS. 9-11, for example, as a vector. For this purpose, the first driver unit 6 is supplied with a pulse control signal 5 consisting of pulses and pulse intervals so that during the pulse interval the switch 7 is conductively controlled via a driver unit 6, and during a pulse said switch is suddenly block controlled.

As previously explained, the present description depicts a first pulse interval with P1, a subsequent pulse with P2 and a second pulse interval following the pulse P2 with P3. Although the present description is restricted to explaining three pulse phases P1, P2 and P3, it is obvious that this phase is followed by a succession of several pulses and pulse intervals. Especially the phases P2 and P3 are repeated.

As previously explained, in the known circuit, it has been arranged that a first switch 7 is located parallel to the consumer 10, and in the negative branch a second switch 13 is connected in parallel with the first switch 7 and in series with the consumer 10. According to a first embodiment, a load 14 is connected in parallel with the second switch 13 which features high load voltage and reduces the fall time of the power.

Moreover, according to the present invention, the second switch 13 is actuated potentially separate via the driver unit 12, which is depicted in FIGS. 9-22, for example, as a vector. Furthermore, a third switch 22 has been provided in the positive branch and said switch is connected in series with the consumer 10 and in parallel with the first switch 7. The third switch 22 is actuated potentially separate via the driver unit 21, which is depicted in FIGS. 9-22, for example, as a vector.

According to the first embodiment, a second load 23 has been provided in parallel with the third switch and said load also features high load voltage.

The term potentially separate actuation in the sense of the present invention means that the pulse control signal 5 is separated in galvanic manner from the driver units and thus it is separated in galvanic manner also from the three switches. Accordingly, the driver units are depicted in FIGS. 9-22, for example, as vectors. However, the drivers can be separated in galvanic manner from the pulse control signal 5 also by means of an optocoupler. Since the driver units are separated in galvanic manner from the pulse control signal 5, the switches are also separated in galvanic manner from the pulse control signal 5. This is necessary because, depending on the phase of the pulse control signal 5, the switches are located on different potentials. Without galvanic isolation from the pulse control signal 5, the switches could not assume different potentials. The isolation allows the switches to float.

In this first embodiment, the first load 14 and the second switch 13, as well as the second load 23 and the third switch 22 are separated components. As subsequently shown by means of further embodiments, it is possible to combine the second switch and the first load in one component. The third switch and the second load can also be combined in one component.

The functionality of the invention-based circuit 11 is subsequently explained by means of the first embodiment depicted in FIGS. 9-11. FIG. 9 shows the first phase P1 of the pulse control signal 5, FIG. 10 shows the second phase P2 of the pulse control signal 5, and FIG. 11 shows the third phase P3 of the pulse control signal 5.

FIG. 9 depicts a pulse inverter which inverts the pulse control signal 5 and transmits the inverted signal to the second driver unit 12 and a third driver unit 21. In their functionality, the second driver unit 12 and the third driver unit 21 correspond to the first driver unit 6, respectively, and they are used to actuate the second switch 13 or the third switch 22. In this first embodiment, the first load 14 is connected in parallel with the second switch 13, and the second load 23 is connected in parallel with the third switch 22.

FIG. 9 depicts the first phase P1 of the pulse control signal 5. During the pulse interval, the first switch 7 is conductively controlled, and the second switch 13 and the third switch 22 are block controlled. The adjusted power $I_1$, which has been impressed by the current source 1, flows through the first inductance 4, the first switch 7 and the second inductance back to the current source 1. The consumer 10, the second switch 13, the third switch 22, as well as the first load 14 and the second load 23 are currentless.

FIG. 10 provides a schematic picture of the second phase P2, namely the pulse signal. By means of the pulse signal, the first switch 7 is suddenly block controlled and, at the same time, the second switch 13 and the third switch 22 are conductively controlled so that the power $I_1$ impressed via the current source 1 no longer flows through the first switch 7 but, because of the behavior of the current source 1, the first inductance 4 and the second inductance 20, said power flows back with a short rise time to the current source 1 in the form of pulses and square waves through the consumer 10, as well as the second switch 13 and the third switch.

FIG. 11 provides a schematic picture of the third phase P3. In this pulse interval, the first switch 7 is again conductively controlled and, at the same time, the second switch 13 and the third switch 22 are block controlled. In this way, the consumer 10, as well as the second switch 13 and the third switch 22 become currentless, and the impressed power $I_1$ flows again back to the current source 1 via the inductances 4, 20 and the first switch 7.

At the start of the third phase P3, power $I_2$ flows through the consumer 10 because of the magnetic energy stored during the second phase P2 in the circuit inductances 8, 9. At the start of the third phase P3, power $I_2$ has the same value as the power $I_1$. However, with increasing time, the power is reduced until it finally reaches zero.

In the first embodiment at hand, a first load 14 has been provided parallel to the second switch, and a second load 23 parallel to the third switch 22. In the embodiment at hand, said load can represent a Zener diode with high Zener voltage, respectively. At this, the decaying power $I_2$ generates a first load voltage $U_{L1}$ or a second load voltage $U_{L2}$ at the first load 14 and at the second load 23, which together with the secondary voltage $U_V$ of the consumer 10 forms an overall voltage with regard to the fall time of the power $I_2$. Advantageously, the first load 14 and the second load 23 are designed in such a way that it produces high load voltage $U_{L1}$ and $U_{L2}$, resulting in a very short fall time of the power $I_2$.

If the secondary voltage $U_V$ and the two load voltages $U_{L1}$ and $U_{L2}$ are not current-dependent, the following applies to the fall time t of the power $I_2$:

$$t = \frac{I_1(L_1 + L_2)}{U_V + U_{L1} + U_{L2}}$$

In the previously mentioned example with a circuit inductance of 50 nH, respectively, a load current of 100 A, a secondary voltage $U_V$ of 2V, and a load voltage $U_L$ of 100 V, respectively, the fall time results in:

$$t = \frac{100A \cdot (50 + 50) \cdot 10^{-9} H}{2V + 100V + 100V} = 49 \cdot 10^{-9} s$$

By means of the present invention in which the first switch 7 is actuated potentially separate, and by means of providing a second switch which is actuated potentially separate and a third switch which is actuated potentially separate, as well as providing a further inductance 20, it is still possible to achieve short fall times and short rise times, the same as in the known circuit. In addition, the present invention allows for low-interference operation. Even in case the control system 2 is coupled with the ground it is possible to provide low-interference operation. Subsequently, in FIGS. 13-16, this aspect is explained in more detail. Here again, the first embodiment is represented in an exemplary manner with a load which is connected in parallel with the second and third switch, respectively. However, the following designs can also be applied to other embodiments.

At this, as in the known circuit, the control system 2 is coupled with the ground 19. This can be achieved either by means of a galvanic connection or in capacitive manner or at high frequency by means of a capacitor 18. In this way, it is possible to reduce high frequency interferences in the control unit, which are mainly caused by the switch mode current source 1. At the same time, each of the two lines to the consumer 10 comprise a line capacity to the earth 19, which are represented in FIGS. 13-16 with a first capacitor 16 and a second capacitor 17 in the equivalent circuit diagram. Even in the case that the control system is not coupled with the ground, the present circuit allows for low interference operation.

FIGS. 4-8 already discussed the different phases in the known circuit. Subsequently, the same phases in the case of the invention-based circuit are explained by means of FIGS. 12-16, emphasizing the advantages of the present invention.

Figure 12:
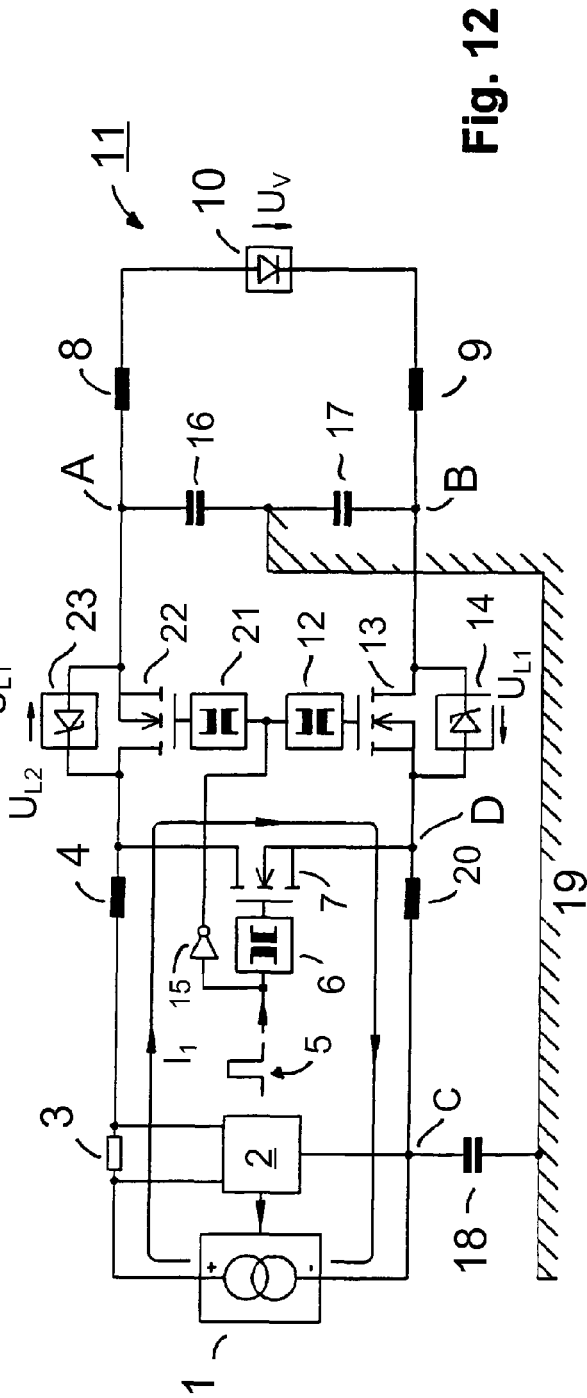

FIG. 12 shows the first phase P1 of the pulse control signal 5. During the pulse interval, the first switch 7 is conductively controlled, the second switch 13 and the third switch 22 are block controlled. The adjusted power $I_1$, which has been impressed by the current source 1, flows through the first inductance 4, the first switch 7 and through the second inductance 20 back to the current source 1. The consumer 10 is currentless.

Figure 13:
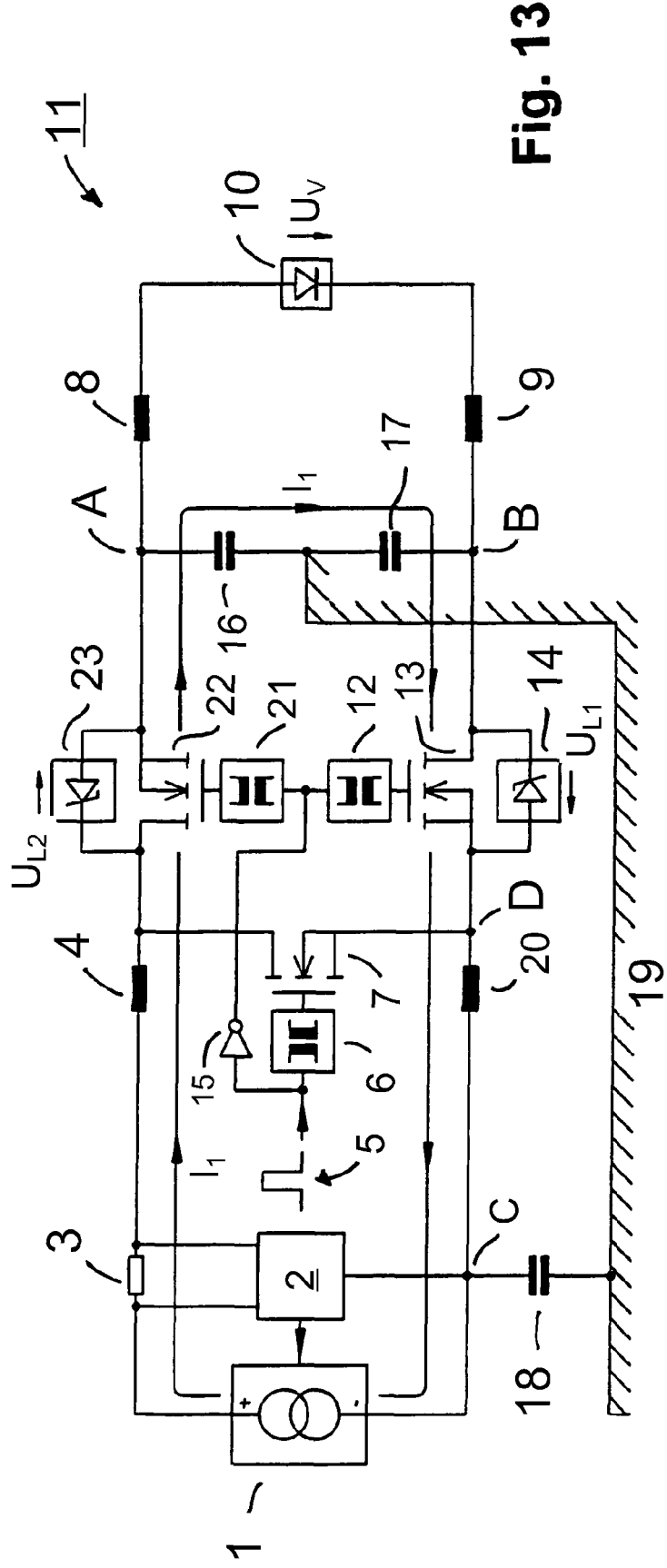

FIG. 13 shows the time period between the end of the first phase P1 and the start of the second phase P2 of the pulse control signal 5. If the first switch 7 is suddenly block controlled and, at the same time, the second switch 13 and the third switch 22 are conductively controlled, the voltage at the first switch 7 jumps to very high values, for example, several 100 V, because the current source 1 and especially the inductances 4 and 20 make an attempt to maintain the current flow $I_1$. However, at first, both circuit inductances 8, 9 prevent a current flow through the consumer 10.

Figure 5:
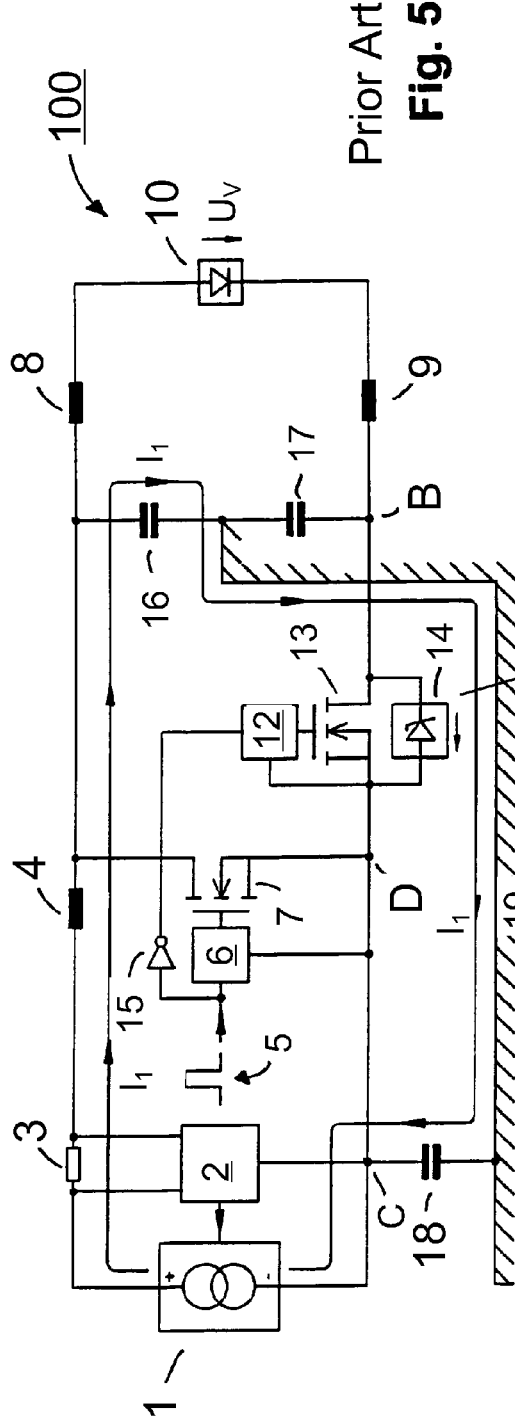
Figure 6:
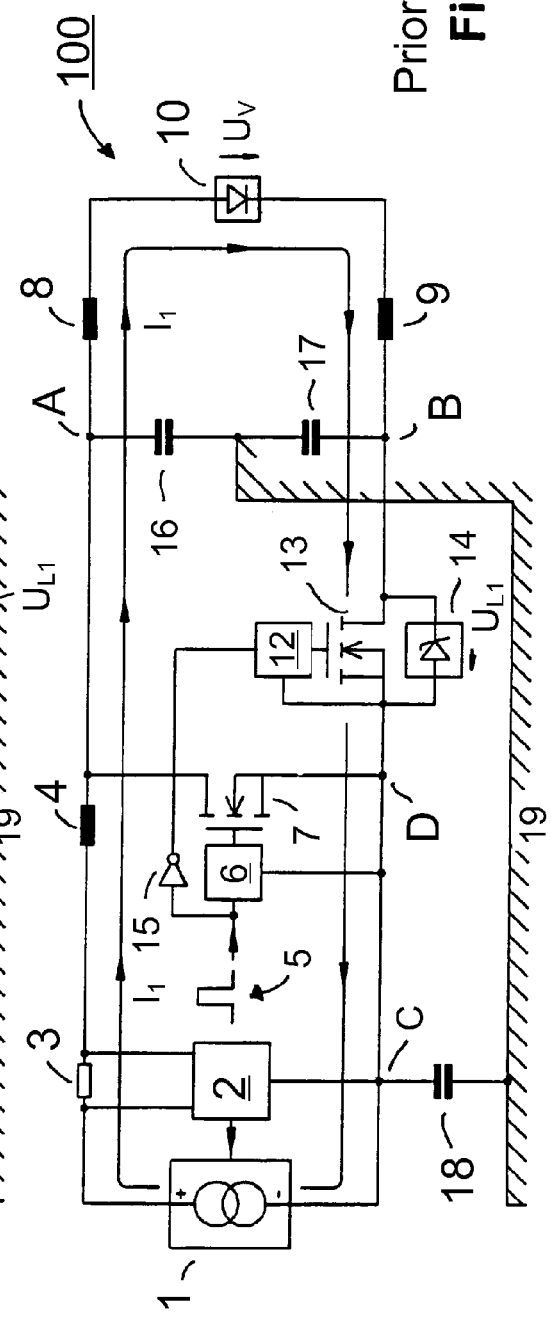
Figure 7:
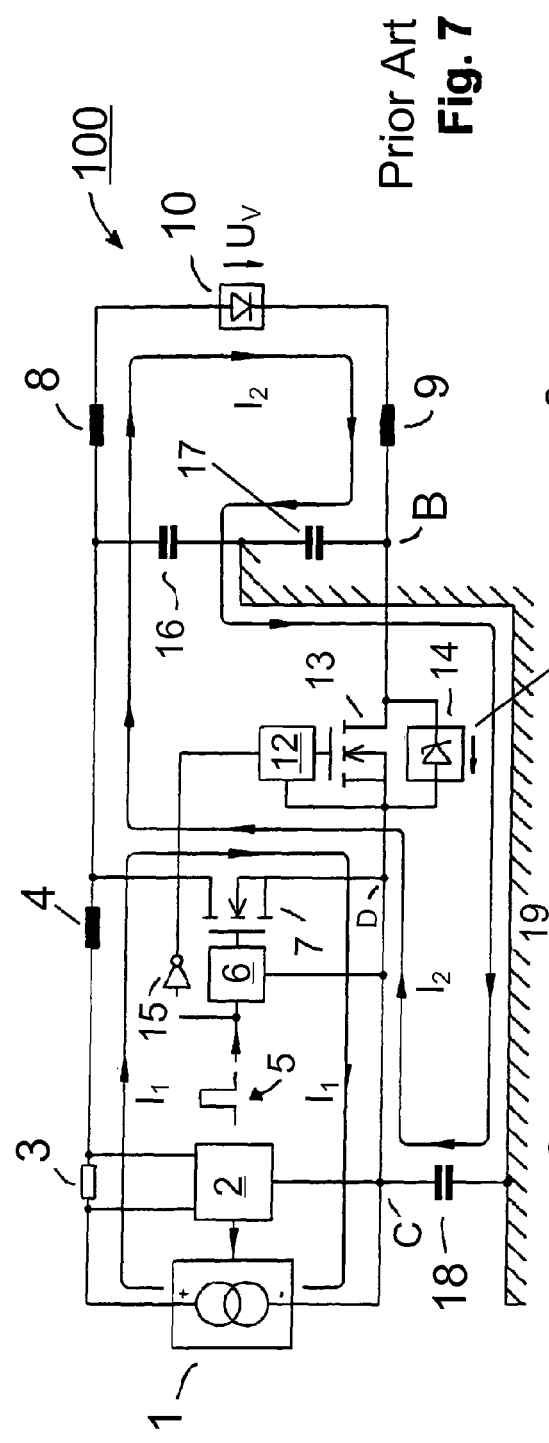
Figure 8:
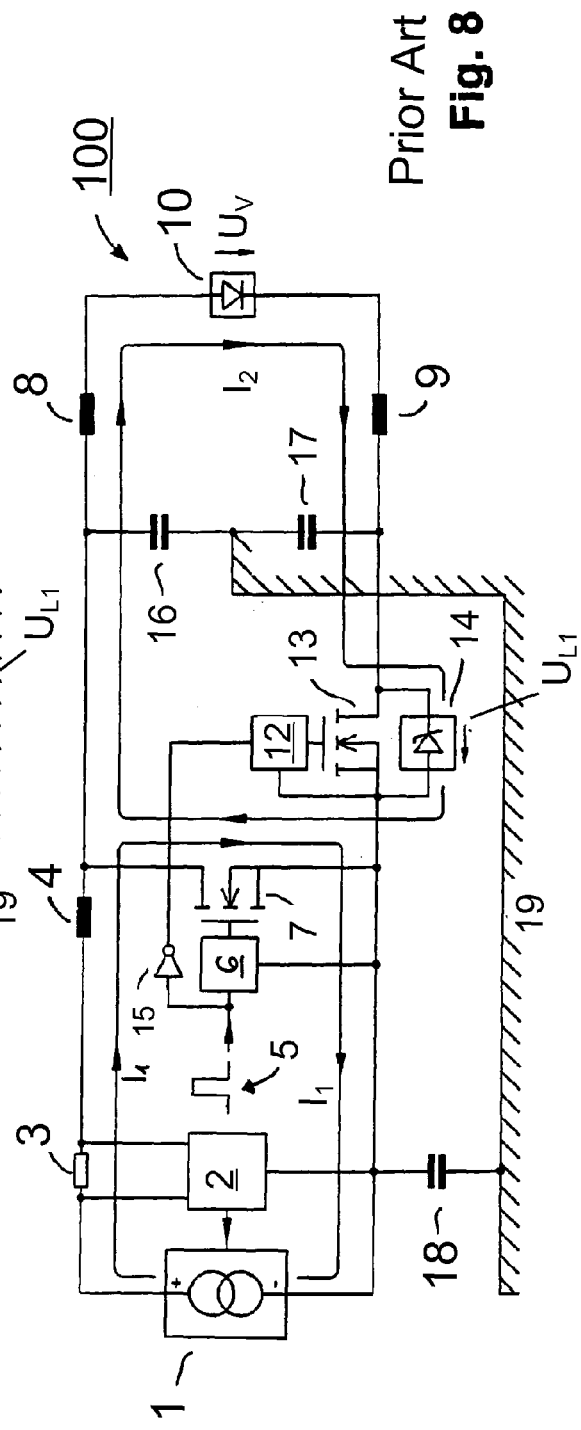

In contrast to the known circuit, which is described in FIG. 5, given the same values of the inductances 4, 20 at the moment of the voltage jump at the first switch 7, the potential at point A in reference to earth jumps to a positive value corresponding to half the voltage at the first switch 7. The potential at point B in reference to earth 19, however, jumps to a negative value corresponding to half the voltage at the first switch 7. Consequently, the impressed power $I_1$ flows via the first line capacity 16, the second line capacity 17 and via the inductance 20 back to the current source 1. As a result, no power flows through the metallic housing or through the earth 19 and via the capacitor 18 back to the current source 1, thus not causing any high frequency interferences. Also in the line between D and C, no high frequency interference voltage occurs because the power $I_1$ in this line remains unchanged. Furthermore, the present circuit guarantees high safety standards, because no power flows through the housing in which such a circuit could be housed.

Figure 14:
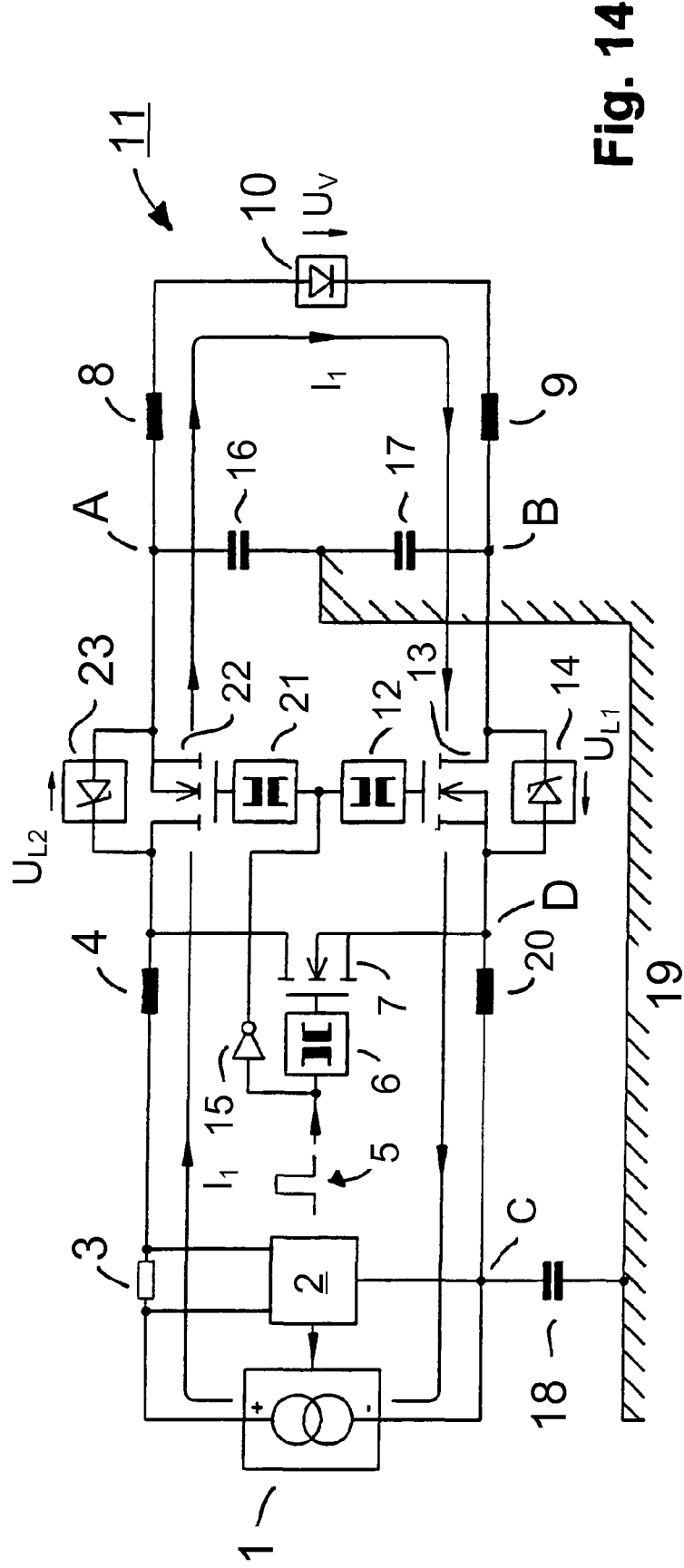

A further advantage involves the fact that in case of equally high circuit inductances 8, 9 the potential from the consumer 10 to the earth remains unchanged. Consequently, the consumer has almost earth potential and therefore the consumer does not have to be isolated to earth with high proof voltage. As a result, it is less likely that certain components of the present circuit 11 fail. In addition, the structure of the housing, in which the circuit is housed, can be simplified because no special isolation is required. In contrast to the known circuit, there are also no high frequency interferences if, as shown in FIG. 14, the consumer has assumed the power $I_1$ in the second phase P2.

Figure 15:
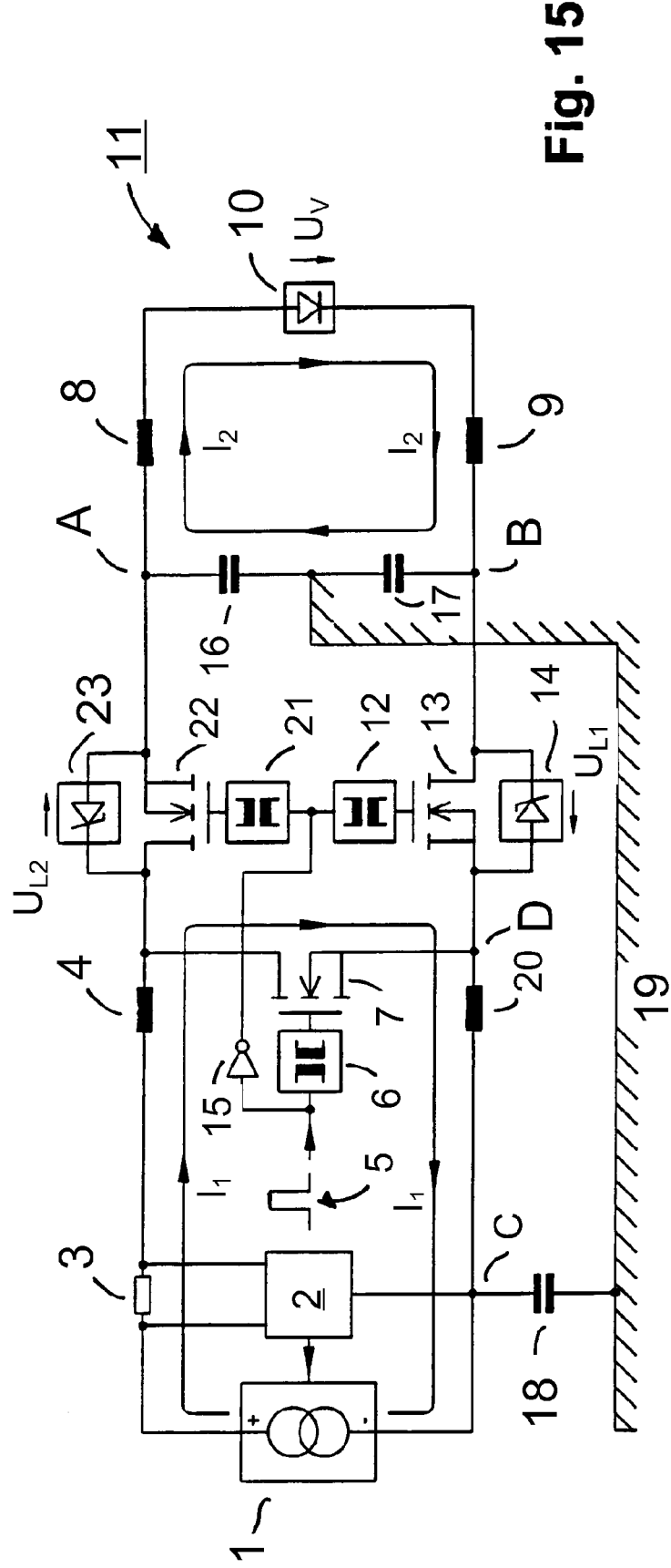

FIG. 15 shows the time period between the end of the second phase P2 and the start of the third phase P3 of the pulse control signal 5. The first switch 7 is suddenly conductively controlled and, at the same time, the second switch 13 and third switch 22 are block controlled. Again the power $I_1$ flows back to the source via the first switch 7. Simultaneously, because of the energy stored in the circuit inductances 8 and 9, an impressed power $I_2$ continues to flow through the consumer 10. Since the second switch 13 and the third switch 22 are blocked, the power no longer flows like in the known circuit (shown in FIG. 7) suddenly via the second line capacity 17 through the metallic housing or through the earth 19 and via the capacitor 18 back in the line between D and C, but it flows back (as shown in FIG. 15) via the second line capacity 17 and the first line capacity.

Figure 16:
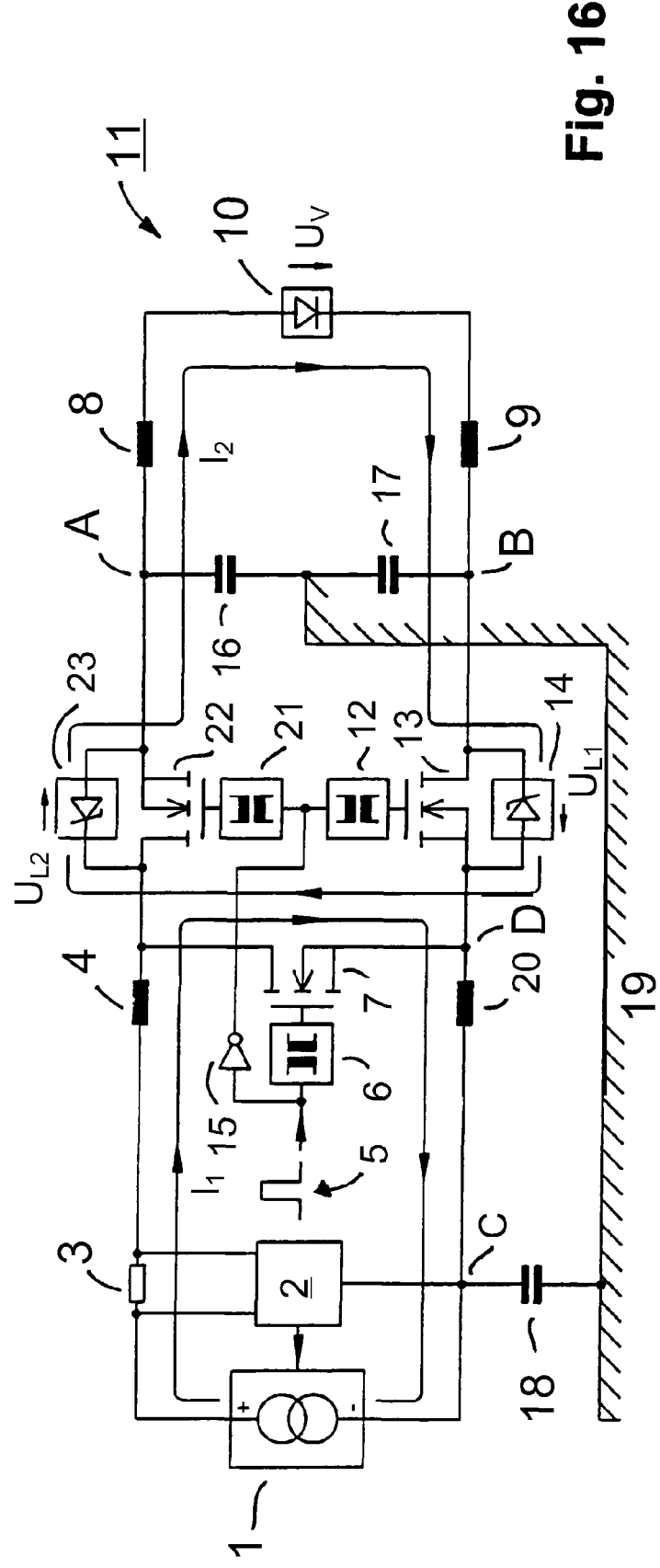

In contrast to the known circuit 100, no high frequencies interferences occur in this case, because no power flows through the metallic housing or through the earth 19. High frequency interference voltage does not even occur in the line between D and C because the power $I_1$ in this line remains unchanged. As shown in FIG. 15, the power $I_2$ very quickly charges the line capacities 16 and 17. If the voltage at the line capacities 16 and 17 has reached the breakdown voltage $U_{L1}$ of the first load 14 and the breakdown voltage $U_{L2}$ of the second load 23, the loads 14, 23 suddenly assume in the third phase P3 (as shown in FIG. 16) the power $I_2$. In contrast to the known circuit, this again does not result in high frequency interferences because no power flows through the metallic housing or through the earth 19, High frequency interference voltage also does not occur in the line between D and C because the power $I_1$ in this line remains unchanged. Also in contrast to the known circuit, the potential at point B to earth 19 jumps to a positive value corresponding to the voltage $U_{L2}$. The potential at point A, on the other hand, jumps to a negative value corresponding to the voltage $U_{L2}$. In case the values of the circuit inductances 8, 9 are equal, the consumer 10 remains almost at earth potential and therefore the consumer does not have to be isolated to earth with high proof voltage.

Consequently, by means of the present invention, high frequency interferences are prevented. At the same time, high safety standards are guaranteed because no power flows through the housing or through the earth. What is more, the functionality of the circuit, which guarantees short fall times of the power $I_2$, is not affected but is actually further improved by an additional load.

The principle of the present invention has been described by means of a first embodiment, which is shown in FIGS. 9-16. Here a load with high load voltage has been connected in parallel with the second switch 13 and the third switch 22, respectively.

Figure 17:
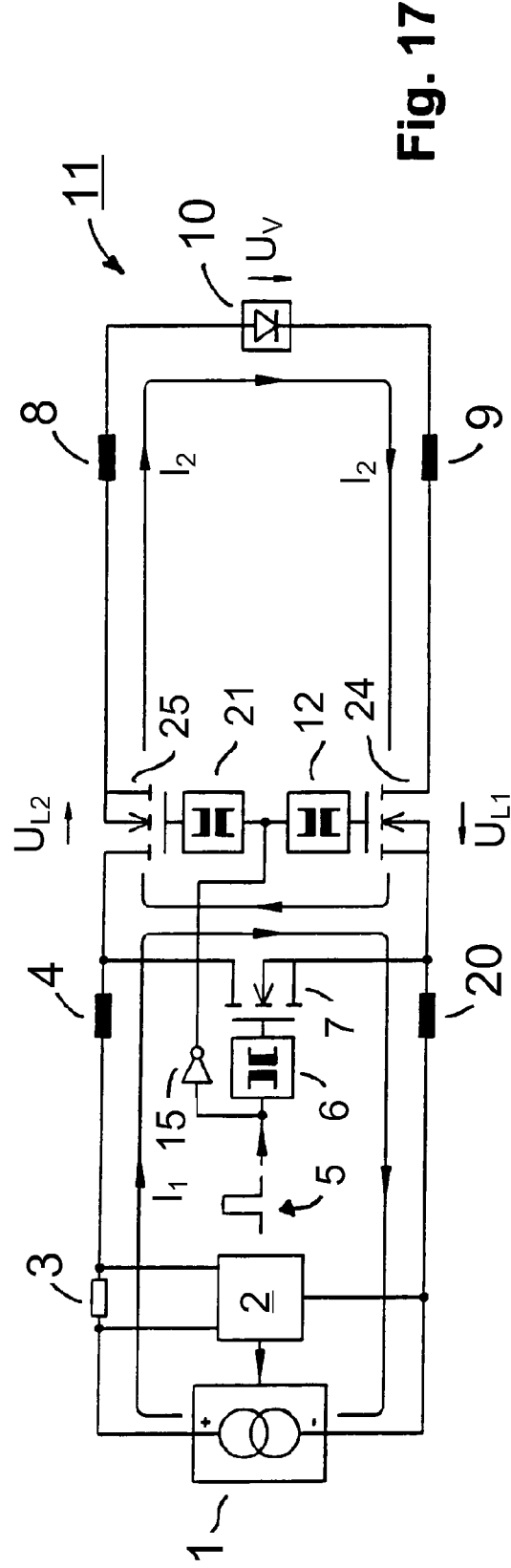

FIG. 17 shows a second embodiment according to the circuit 11 of the present invention. The second switch 24 used in the embodiment shown in FIG. 17 is a semi-conductor switch with controlled avalanche behavior, which provides this switch with the additional function of a load. The third switch 25 is also a semi-conductor switch with controlled avalanche behavior, which provides the third switch 25 also with the additional function of a load. Consequently, it is not required to have, as in the first embodiment, an additional load which is connected in parallel with the respective switch. The avalanche behavior of both switches 24, 25 can be produced through the characteristics of the semi-conductor itself or through suitable external wiring of the semi-conductor. At the start of the third phase P3, while the second switch 24 and the third switch 25 are block controlled, the power $I_2$ generates at the switches such high voltage that said switches reach the avalanche breakthrough and keeps the present voltage at the value of breakdown voltage until the power $I_2$ has reached zero. If a semi-conductor with high breakdown voltage is selected for the second and third switch 24, 25, the fall time of the power $I_2$ is very short.

FIGS. 18-22 show further embodiments of the present invention-based circuit 11, in which the second switch 24 and the third switch 25 each are a semi-conductor switch with controlled avalanche behavior. In the embodiments shown, the second switch 24 and the third switch 25 have a parasitic parallel capacity (drain-source capacity), which are displayed in the diagram as capacitors 26 and 27. At the start of the third phase P3, when the power $I_2$ approaches the zero point, the second switch 24 and the third switch 25 transfer, while the breakdown voltage is present, from the avalanche breakthrough to the blocking state. At this the parallel capacities remain unwantedly loaded at a voltage value of $U_{C2}$ or $U_{C3}$, corresponding to the values of the breakdown voltage of the second switch 24 and the third switch 25. These voltages $U_{C2}$ or $U_{C3}$ are directed in such a way that they rest inversely against the consumer 10. If, for example, a diode with low blocking voltage is used as consumer 10, it would be destroyed as a result of the present inverse voltage. In the following embodiments this problem is avoided.

Figure 18:
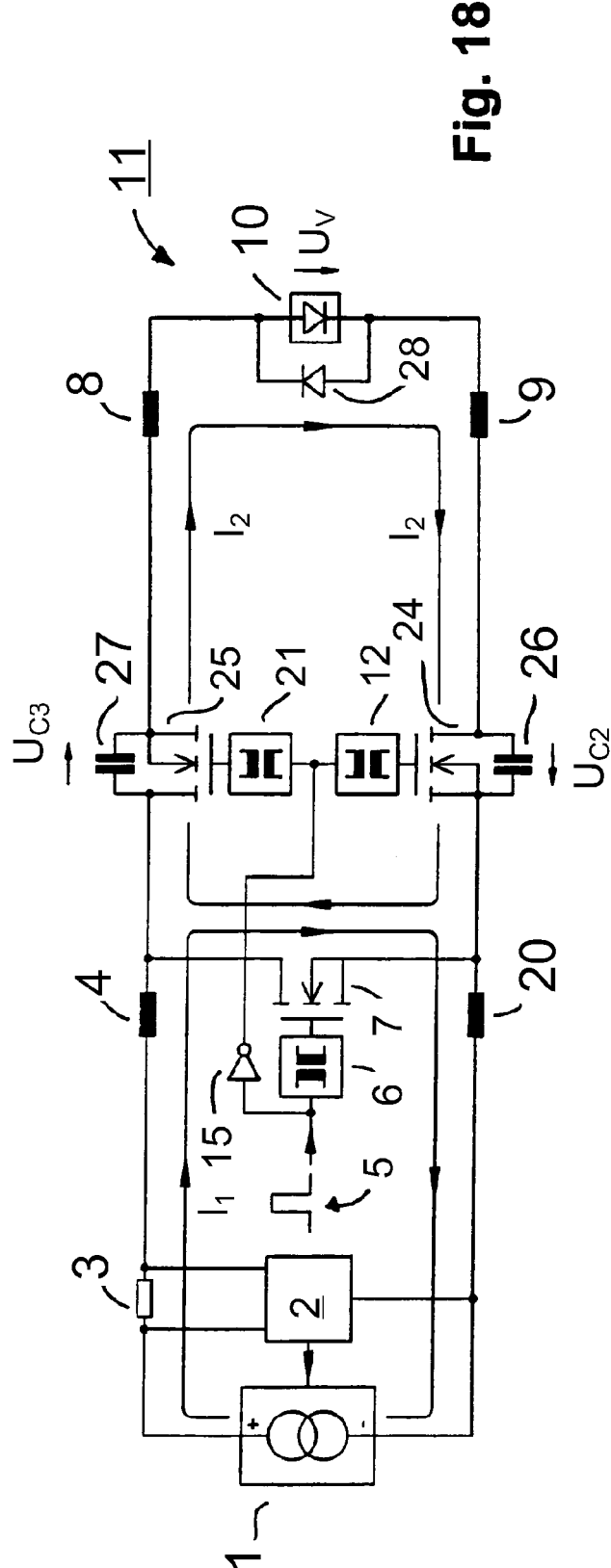

FIG. 18 shows a third embodiment of the present invention, in which a first protective diode 28 is connected in parallel with the consumer 10, thus avoiding an inverse voltage at the consumer 10.

FIG. 19 shows a fourth embodiment of the invention-based circuit 11, in which a second protective diode 29 in the negative branch is connected in series with the consumer 10 and in which a third protective diode 30 in the positive branch is connected in series with the consumer 10, also in this case avoiding an inverse voltage at the consumer 10.

FIG. 20 shows a fifth embodiment, in which a first resistor 31 is connected in parallel with the second switch 24, thus discharging the parasitic parallel capacity 26 of the switch 24. Similarly, a second resistor 32 has been provided in parallel with the third switch 25 which discharges the parasitic parallel capacity 27 of the switch 25. Here the resistors are dimensioned in such a way that at the time in which the power $I_2$ has reached zero also the voltages $U_{C2}$ or $U_{C3}$ at the second or third switch 24, 25 have reached zero. Consequently, the capacities have been discharged and inverse voltage at the consumer 10 has been avoided.

FIG. 21 shows a sixth embodiment of the invention-based circuit 11, in which a first constant current load 33 is connected in parallel with the second switch 24 and a second constant current load 34 is connected in parallel with the third switch 25, thus discharging the capacities of the capacitors 26, 27. Here the constant current loads 33, 34 are dimensioned in such a way that at the time in which the power $I_2$ has reached zero also the voltages $U_{C2}$ or $U_{C3}$ at the second or third switch 24, 25 have reached zero. Consequently, the capacities have been discharged and inverse voltage at the consumer has been avoided.

FIG. 22 shows a seventh embodiment of the invention-based circuit, in which the power $I_2$ is measured via a third resistor 35 which is connected in series with the second switch 24, and the measuring signal is supplied to the second switch 24 via a suitable arrangement in the driver circuit 12 in such a way that said switch is again conductively controlled below a specific current value $I_2$ and thus the capacity of the parasitic capacitor 26 is discharged if the power $I_2$ has reached zero. A similar arrangement is also displayed with a fourth resistor 36, which is connected in series with the third switch 25. Thus no inverse voltage occurs at the consumer 10. Instead of performing a current measurement by means of a resistor, it is also possible to use any other type of current measurement in order to conductively control again the second switch 24 and the third switch 25 below a specific current value $I_2$. For example, the current measurement can also be performed by means of a current transformer.

The possibilities mentioned in the embodiments two to seven with regard to providing the consumer 10 with a protection against inverse voltage can also be applied to the first embodiment.

The present invention is not restricted to the embodiments shown. For example, it is possible to design one of the two switches 24, 25 as a switch with a separate load connected in parallel, and the other switch as a combined component consisting of switch and load. In particular, the load can comprise a resistor, a voltage-dependent resistor, a capacitor, a diode, a Zener diode, a suppressor diode, a semi-conductor with controlled avalanche behavior or a combination herefrom.

Furthermore, the present invention is not restricted to the embodiment in which the control system 2 is coupled with the ground 19. Rather the provision of three potentially separately actuated switches generally allows for a low interference operation with short rise and fall times.

The invention claimed is:

1. A circuit for controlling the power supply of a consumer, said circuit comprising:
    a current source with two inductances connected in series for providing a power supply for a consumer, wherein the circuit includes a negative branch and a positive branch,
    a potentially separately actuated first switch connected in parallel with the series connection consisting of the current source and the inductances, in which through opening and closing of the first switch the power is transmitted to the consumer in the form of square wave current pulses,
    a series connection arranged in parallel with the first switch, which series connection consists of a potentially separately actuated second switch in the negative branch, the consumer and a potentially separately actuated third switch in the positive branch,
    wherein the circuit includes a first load with a load voltage connected in parallel with the second switch, or the second switch includes a breakdown voltage comprising a load combined with the second switch, and wherein the circuit includes a second load with a load voltage connected in parallel with the third switch, or the third switch includes a breakdown voltage comprising a load combined with the third switch,
    and wherein the second switch and the third switch are opened and closed in anti-phase manner to the first switch.

2. A circuit according to claim 1, wherein the current source is a DC current source.

3. A circuit according to claim 1, wherein the first load and/or the second load comprise a resistor, a voltage-dependent resistor, a capacitor, a diode, a Zener diode, a suppressor diode, a semi-conductor with controlled avalanche behavior or a combination herefrom.

4. A circuit according to claim 1, wherein at least one of the second switch including a breakdown voltage load and the third switch including a breakdown voltage load comprise a semi-conductor switch with controlled avalanche behavior.

5. A circuit according to claim 4, wherein the controlled avalanche behavior of the semi-conductor switch results from the characteristics of the semi-conductor.

6. A circuit according to claim 4, wherein the controlled avalanche behavior of the semi-conductor can result from external wiring of the semi-conductor.

7. A circuit according to claim 1, wherein a first protective diode is connected in parallel with the consumer.

8. A circuit according to claim 1, wherein a second protective diode in the negative branch is connected in series with the consumer and a third protective diode is connected in series with the consumer in the positive branch.

9. A circuit according to claim 1, wherein the first load comprises a first resistor connected in parallel with the second switch, and wherein the second load comprises a second resistor is connected in parallel with the third switch.

10. A circuit according to claim 1, wherein a first constant current load is connected in parallel with the second switch, and wherein a second constant current load is connected in parallel with the third switch.

11. A circuit according to claim 1, wherein a system for current measurement has been provided and by means of a suitable arrangement a signal is supplied to the second switch and the third switch in such a way that the second switch and the third switch are again conductively controlled below a specific power.

12. A method for operating a circuit, wherein the circuit comprises
- a negative branch and a positive branch,
- a current source with two inductances connected in series for providing a power supply to a consumer,
- a potentially separately actuated first switch consisting of the current source and the inductances which is connected in parallel to the series connection,
- a series connection which is arranged in parallel with the first switch, which series connection consists of a potentially separately actuated second switch in the negative branch, the consumer and a potentially separately actuated third switch in the positive branch,
- wherein the circuit includes a first load with a load voltage connected in parallel with the second switch, or the second switch includes a breakdown voltage comprising a load combined with the second switch, and wherein the circuit includes a second load with a load voltage connected in parallel with the third switch, or the third switch includes a breakdown voltage comprising a load combined with the third switch, the method comprising the steps:
- opening and closing of the first switch in order to transmit square wave current pulses to the consumer and
- opening and closing of the second switch and the third switch in anti-phase manner to the first switch.

13. A circuit for controlling the power supply of a consumer, said circuit comprising:
- a current source with two inductances connected in series for providing a power supply for a consumer, wherein the circuit includes a negative branch and a positive branch,
- a potentially separately actuated first switch connected in parallel with the series connection consisting of the current source and the inductances, in which through opening and closing of the first switch the power is transmitted to the consumer in the form of square wave current pulses,
- a series connection arranged in parallel with the first switch, which series connection consists of a potentially separately actuated second switch in the negative branch, the consumer and a potentially separately actuated third switch in the positive branch,
- a load operatively associated with the second switch and a load operatively associated with the third switch
- wherein the second switch and the third switch are opened and closed in anti-phase manner to the first switch.

14. The circuit according to claim 13, wherein the load operatively associated with the second switch comprises a first load with a load voltage connected in parallel with the second switch.

15. The circuit according to claim 13, wherein the load operatively associated with the third switch comprises a second load with a load voltage connected in parallel with the third switch.

16. The circuit according to claim 13, wherein the second switch has a breakdown voltage functioning as the load operatively associated with the second switch.

17. The circuit according to claim 13, wherein the third switch has a breakdown voltage functioning as the load operatively associated with the third switch.

* * * * *